United States Patent [19]

Gupta et al.

[11] Patent Number: 5,534,340
[45] Date of Patent: Jul. 9, 1996

[54] NONWOVEN MATERIALS COMPRISING 0.5 TO 1.2 DECITEX CARDABLE POLYOLEFIN FIBERS AND HAVING LIQUID STRIKE THROUGH RESISTANCE AS WELL AS AIR PERMEABILITY

[75] Inventors: Rakesh K. Gupta; Richard J. Legare, both of Conyers, Ga.

[73] Assignee: Hercules Incorporated, Wilmington, Del.

[21] Appl. No.: 145,360

[22] Filed: Oct. 29, 1993

[30] Foreign Application Priority Data

Apr. 6, 1993 [GB] United Kingdom ............... 9307117

[51] Int. Cl.⁶ .............. B32B 27/00; B32B 5/06; D02G 3/00
[52] U.S. Cl. .............. 428/286; 428/284; 428/287; 428/288; 428/298; 428/373; 428/378; 428/903
[58] Field of Search ............ 428/284, 286, 428/287, 288, 297, 298, 303, 373, 378, 903

[56] References Cited

U.S. PATENT DOCUMENTS

| | | | |
|---|---|---|---|
| 4,097,943 | 7/1978 | O'Connell | 5/335 |
| 4,105,381 | 8/1978 | Platt et al. | 425/83.1 |
| 4,196,245 | 4/1980 | Kitson et al. | 428/198 |
| 4,508,113 | 4/1985 | Malaney | 128/132 |
| 4,555,811 | 12/1985 | Shimalla | 2/51 |
| 4,623,575 | 11/1986 | Brooks et al. | 428/113 |
| 4,657,804 | 4/1987 | Mays et al. | 428/212 |
| 4,808,467 | 2/1989 | Suskind et al. | 428/284 |
| 4,837,078 | 6/1989 | Harrington | 428/284 |
| 4,868,031 | 9/1989 | Modrak et al. | 428/198 |
| 4,883,707 | 11/1989 | Newkirk | 428/219 |
| 4,904,520 | 2/1990 | Dumas et al. | 428/212 |
| 4,938,832 | 7/1990 | Schmalz | 156/308.8 |
| 5,019,066 | 5/1991 | Freeland et al. | 604/385.2 |
| 5,045,387 | 9/1991 | Schmalz | 428/284 |
| 5,108,827 | 4/1992 | Gessner | 428/219 |
| 5,257,982 | 11/1993 | Cohen et al. | 604/378 |
| 5,281,378 | 1/1994 | Kozulla | 264/83 |
| 5,288,348 | 2/1994 | Modrak | 156/62.2 |
| 5,289,694 | 3/1994 | Thompson et al. | 181/286 |
| 5,294,482 | 3/1994 | Gessner | 428/287 |

FOREIGN PATENT DOCUMENTS

| | | |
|---|---|---|
| 2053831 | 6/1992 | Canada . |
| 296572 | 12/1988 | European Pat. Off. . |
| 367989 | 5/1990 | European Pat. Off. . |
| 445536 | 9/1991 | European Pat. Off. . |
| 516412 | 5/1992 | European Pat. Off. . |
| 486158 | 5/1992 | European Pat. Off. . |
| 490476 | 6/1992 | European Pat. Off. . |
| 538047 | 4/1993 | European Pat. Off. . |
| 552013 | 7/1993 | European Pat. Off. . |
| 4333652 | 2/1993 | Japan . |
| 4333651 | 2/1993 | Japan . |

*Primary Examiner*—James D. Withers
*Attorney, Agent, or Firm*—Mark D. Kuller; Joanne W. Patterson

[57] ABSTRACT

The fabrics of this invention have a unique combination of liquid barrier properties and high air permeability and comprise at least one carded nonwoven web comprising at least 10% by weight, based on the total weight of cardable fibers, of cardable polyolefin fibers having a fiber fineness of about 0.5 to about 1.2 decitex. Preferably the polyolefin fibers are hydrophobic polyolefin fibers, and the nonwoven material is thermally bonded. Laminates comprising at least one layer of the fabrics of this invention and at least one layer of another nonwoven material have the same unique combination of properties.

90 Claims, No Drawings

NONWOVEN MATERIALS COMPRISING 0.5 TO 1.2 DECITEX CARDABLE POLYOLEFIN FIBERS AND HAVING LIQUID STRIKE THROUGH RESISTANCE AS WELL AS AIR PERMEABILITY

FIELD OF THE INVENTION

This invention relates to nonwoven materials made from polyolefin fibers, and to laminates incorporating these materials.

BACKGROUND OF THE INVENTION

Nonwoven web structures are generally produced using three basic processes: (1) spunbonding, where continuous filaments are extruded and deposited on a screen to form a continuous nonwoven structure; (2) meltblowing, where the extruded polymer melt is stretched, broken into short fibers, blown by a jet of heated air, and deposited on a belt to form the nonwoven structure; and (3) carding, where staple fibers are separated by a carding machine and laid out in a nonwoven web structure.

Nonwoven materials are commonly used in the manufacture of protective garments such as those worn by medical personnel, clean room personnel, and farm workers. For example, U.S. Pat. No. 4,196,245 describes a composite nonwoven fabric for use in disposable surgical items that comprises at least two hydrophobic plies of microfine fibers of a fiber diameter of up to about 10 microns, and at least one nonwoven cover ply. U.S. Pat. No. 4,508,113 discloses a water impervious laminated material comprising a three-ply hydrophobic microfine fiber structure sandwiched between and fuse-bonded to two layers of conjugate fibers having a low melting sheath and a high melting core. U.S. Pat. No. 4,555,811 describes a water impervious microfine fiber laminated material for use in making disposable operating room gowns and comprising an inner creped hydrophobic microfine fiber structure sandwiched between and bonded to two reinforcing layers of nonwoven fibers. U.S. Pat. No. 5,108,827 discloses a thermally-bonded nonwoven fabric that is made from a web comprising 100 to 5 weight percent multiconstituent fibers. The fibers are made from a dispersion of two or more polymers that can be melt spun into fibers and then formed into webs, e.g., by carding, airlaying, or wetlaying. Biconstituent staple fibers made from a blend of ethylene/1-octene and polypropylene can be used.

Nonwoven materials to be used in the manufacture of such protective garments have two essential requirements: liquid barrier properties, and comfort to the wearer. Most of the liquid barrier fabrics currently available exhibit very low air permeability, causing heat build-up and therefore heat stress for the garment wearer. Some currently available fabrics such as spunbonded materials provide adequate air flow, but lack the required liquid barrier properties. There is a need for a nonwoven material that exhibits a combination of impermeability to liquids and high air permeability.

SUMMARY OF THE INVENTION

The fabrics of this invention comprise at least one carded nonwoven web comprising at least 10% by weight, based on the total weight of cardable fibers, of cardable polyolefin staple fibers having a fiber fineness of 0.5 to 1.2 decitex. Preferably the polyolefin fibers are hydrophobic polyolefin fibers, and the nonwoven material is thermally bonded. The fabric preferably has a liquid strike-through resistance (mm of $H_2O$) of at least 150 millimeters and an air permeability of at least 100 cubic feet per minute. The cardable polyolefin fibers having the specified fiber fineness can be blended with other cardable fibers, including polyolefin fibers having a fiber fineness greater than or less than 0.5 to 1.2 decitex, and cardable fibers other than polyolefin fibers.

The fabrics of this invention can be combined in a laminate structure with webs of other nonwoven materials, including webs made from polyolefin fibers having a different fiber fineness, webs made from cardable fibers other than polyolefin fibers, and webs made from noncardable fibers. The fabrics of this invention can also be combined with polymer films, preferably breathable polyethylene or polypropylene films.

The fabrics of this invention and laminates comprising at least one layer of the fabrics of this invention in combination with another nonwoven material provide a unique combination of good liquid barrier properties and high air permeability.

DETAILED DESCRIPTION OF THE INVENTION

The fabrics of this invention comprise at least one carded nonwoven web comprising at least 10%, preferably at least 20%, and most preferably at least 40% cardable polyolefin staple fibers having a fiber fineness of about 0.5 to about 1.2 decitex. Preferably the cardable polyolefin fibers have a fiber fineness of about 0.7 to about 1.2 decitex, most preferably about 0.8 to about 1.0 decitex. Decitex is the weight in grams of 10,000 meters of each fiber. The staple fibers are preferably about 1 to about 6 inches long, more preferably about 1 to about 3 inches, and most preferably about 1¼ to about 2 inches long.

The polyolefin staple fibers suitable for use in this invention can be splittable or fibrillated and preferably have a hydrophobic surface. The polyolefin fibers can be made from either linear or branched polyolefins. Suitable cardable polyolefin fibers include polypropylene fibers, including atactic, syndiotactic and isotactic polypropylenes; polyethylene fibers, including low density, high density and linear low density polyethylenes, and fibers made from copolymers of 1-olefins such as, for example, ethylene, propylene, butene, octene, and hexene, e.g., a copolymer of ethylene and propylene. Preferred hydrophobic polyolefin fibers are hydrophobic polypropylene fibers. If multicomponent sheath/core fibers are used, the fibers preferably have the polyolefin in the sheath. The core can be a polyolefin or another polymer such as, for example, a polyamide or polyester. The preferred multicomponent fibers are sheath/core bicomponent fibers.

The fabrics can be made entirely from cardable polyolefin staple fibers having a fiber fineness of about 0.5 to about 1.2 decitex, or these polyolefin fibers can be blended with other cardable fibers, including polyolefin fibers having a fiber fineness greater than or less than about 0.5 to about 1.2 decitex, and cardable fibers other than polyolefin fibers. The fibers should preferably be uniformly dispersed during the blending process in order to maintain the desired combination of impermeability to liquids and high air permeability. The other cardable fibers can be multicomponent or multiconstituent fibers. Examples of multicomponent fibers are sheath/core and side-by-side fibers, where each component of the fiber is spun from a single polymer. Multiconstituent fibers are spun from a polymer melt that is a blend of polymers. If the other cardable fibers are not hydrophobic, they should preferably be treated to make them hydrophobic.

The other cardable fibers used in the blends can include hydrophilic fibers with fluorocarbon surface finishes, or fibers with fluorocarbons added to the melt from which the fiber was spun as described by Thompson et al., *Tappi Journal,* May 1992, pages 124–134, which is incorporated herein by reference. Alternatively, the fabrics made from blends of cardable polyolefin fibers and hydrophilic fibers can be post-treated with fluorocarbons. Suitable hydrophilic fibers include, for example, polyamide, polyester, rayon, hydrophilic polyolefin, and cellulosic fibers. A fluorocarbon is defined as a compound of carbon and fluorine, with or without hydrogen, analogous to a hydrocarbon in which all or nearly all of the hydrogen has been replaced by fluorine. Suitable fluorocarbon surface finishes include SCOTCHGUARD® FC, available from Minnesota Mining & Manufacturing Co., St. Paul, Minn. Suitable fluorocarbon additives for the polymer melt include, for example, FX 1801 fluorocarbon additive available from Minnesota Mining & Manufacturing Co., St. Paul, Minn.

The cardable polyolefin staple fibers used in the preparation of the fabrics of this invention can be treated with a surface finish comprising an antistatic agent and a lubricant. Polyolefin fibers with such a finish are described, for example, in U.S. Pat. No. 4,938,832, which is incorporated by reference in its entirety, where the surface finish comprises a neutralized phosphoric acid ester and a polysiloxane.

The fabrics of this invention comprising at least one carded nonwoven web comprising at least 10% by weight of cardable polyolefin staple fibers having a fiber fineness of about 0.5 to about 1.2 decitex preferably have a liquid strike-through resistance (mm of $H_2O$) of at least about 150 millimeters, most preferably at least 200 millimeters. These materials preferably also have an air permeability of at least about 80 cubic feet per minute (40.6 $cm^3/cm^2/sec$), most preferably at least about 100 cubic feet per minute (50.8 $cm^3/cm^2/sec$). The basis weight of the fabrics is preferably about 10 to about 100 $g/m^2$.

In the manufacture of the fabrics of this invention, the cardable fibers are carded using a series of sequentially arranged carding machines. The carded webs from the various machines are deposited on top of each other on a moving belt to form a layered web structure. This layered web structure is "the fabric of this invention" referred to in this specification.

The fabric of this invention can also be combined with one or more layers of other nonwoven materials such as webs of cardable polyolefin fibers having a fiber fineness greater than or less than about 0.5 to about 1.2 decitex; webs of cardable fibers other than polyolefin fibers; webs of noncardable fibers such as spunbonded, meltblown or hydroentangled webs, or with one or more layers of film, preferably breathable films. Other cardable fibers include, for example, polyamide, polyester, rayon and cotton fibers. If the other nonwoven material is not hydrophobic, it should preferably be treated to make it hydrophobic. Suitable films include, for example, polyethylene, polypropylene, polyester, and breathable polyethylene and polypropylene films. The other nonwoven material or film can be combined with the thermally bonded fabrics of this invention, or the fabrics of this invention can be combined with the other nonwoven materials or film before thermal bonding.

Any of these nonwoven materials can be consolidated to improve fabric strength using any one or a combination of techniques such as, for example, calender thermal bonding, through-air bonding, hydroentangling, needle-punching, ultrasonic bonding, and latex bonding.

Laminates comprising at least one layer of a fabric comprising at least one carded nonwoven web comprising at least 10% cardable polyolefin fibers having a fiber fineness of about 0.5 to about 1.2 decitex combined with at least one layer of another nonwoven material preferably have a liquid strike-through resistance (mm $H_2O$) of at least 150 millimeters, most preferably at least 200 millimeters. These laminates also preferably have an air permeability of at least 80 cubic feet per minute, most preferably at least 100 cubic feet per minute.

The fabrics of this invention can be used in any applications where a combination of good liquid barrier properties and high air permeability are required, e.g., filtration media, medical and clean room garments, CSR wrap, and absorbent article backsheets. They are particularly useful for protective clothing.

The liquid strike-through resistance (mm $H_2O$) of the fabrics of this invention is determined using a rising water column height test. This test subjects one side of a fabric to increasing water pressure, as indicated by the height of the distilled water column, until water droplets are observed on the other side of the fabric. The higher the height of the water column (pressure), the better the fabric's water barrier properties.

The procedure used for this test is as follows. A 10 cm×10 cm fabric sample was mounted at the bottom of a transparent graduated cylinder having an inside diameter of 3.8 cm. Filtered demineralized water was pumped just above the fabric surface at the rate of 4.8 ml/second (an increase in water column height of 4.2 millimeters/second). The other side of the test fabric was observed for the first signs of water penetration. As soon as the first sign of water penetration was observed (indicated by a drop of water), the water column height was recorded. This procedure was repeated for five replicate samples. The average water column height for these five replicates represents the rising water column test value of the test fabric.

The air permeability of the fabric was measured using the ASTM D737-75 test procedure. The air permeability was measured in cubic feet per minute $(CFM)/ft^2$ against an air pressure drop of 0.5 inches (12.7 mm) of water across the fabric sample. Air permeability can also be expressed as $cm^3/cm^2/sec$ by multiplying the CFM value by 0.508.

The grab strength of the fabrics was measured using the ASTM D1682-64 test procedure.

The web or fabric basis weight is the weight in grams of one square meter of web or fabric.

The fiber fineness is expressed in terms of decitex. Decitex is defined as the weight in grams of a 10,000 meter length of a fiber. A lower decitex (dtex) value indicates a finer fiber. The fiber decitex can be determined either by direct weight measurement or by indirect means such as calculations based on the cross-sectional area of the fiber and the fiber density.

The polypropylene fibers used in the examples were hydrophobic Type 190, Type 195, and Type 211 fibers available from Hercules Incorporated, Wilmington, Del. The pigmented fibers, as denoted by color, contained normal amounts of pigments as used in the art, i.e., up to 5% based on the total weight of the fibers.

EXAMPLE 1

Nonwoven webs were produced by using a series of sequentially arranged carding machines that were supplied with polypropylene hydrophobic staple fibers (Types 190, 195, and 211) having a cut length of 3.8 cm and with the fineness indicated in the following table. These staple fibers were carded by the carding machines, and carded webs were deposited on top of each other on the moving belt to form a layered web structure for in-line thermal consolidation at a line speed of 23 to 30 meters/minute. The basis weight of individual webs was varied as indicated in the tables to make composite structures. The thermal consolidation was carried out by using heated calender rolls with a point pattern and a total bond area of 15%. The temperature of the calender rolls is also indicated. The decitex (dtex) and the percent of the total weight of fibers supplied to each carding machine are given in Table 1. The letter designation after the dtex value indicates the color of the fiber: W—white; B—blue; G—green; Y—yellow. The 2.4 decitex white fibers (2.4W) were Type 190 fibers; 0.8 decitex white fibers (0.8W) were Type 195 fibers, and other fibers in the following table were Type 211 fibers. These hydrophobic fibers had surface finishes comprising a mixture of 50% polydimethylsiloxane available from OSi Specialties, Inc., Danbury, Conn. as grade Y12, 411 and 50% LUROL® AS-Y neutralized phosphate esters available from G.A. Goulston Co., Monroe, N.C.

Example 1. The carding machines were supplied with polypropylene hydrophobic staple fibers Type 211 (available from Hercules Incorporated, Wilmington, Del.) with differing or similar fineness as indicated in Table 2. The staple fibers were carded by the carding machine and carded webs were deposited on top of each other on a moving belt to form a layered web structure for inline thermal consolidation at a line speed of 13.7 meters/minute. The basis weight of individual webs was varied as indicated in Table 3 to make composite structures. In some samples a finish-free polypropylene spun-bonded fabric with 14 g/m$^2$ basis weight from American Nonwovens, Inc., Vernon, Ala., U.S.A., was incorporated prior to calender bonding. Samples O and R contained the spunbonded fabric at the bottom of the combined carded webs from carding machines 1 through 4 and in sample P the spunbonded fabric was fed between carding machines 2 and 3, thereby sandwiching the spunbonded fabric between two sets of the carded webs of this invention. Thermal bonding was carried out by using heated calendar rolls with a point pattern with a total bond area of 15%. The temperatures of the calender rolls are also indicated in Table 2. The first temperature is the temperature of the top calender and the second temperature is the temperature of the bottom calender. The decitex (dtex) and the percent of the total

TABLE 1

| Sample | Carding Machine Number | | | | | | | | Total Fabric Basis Weight (g/m$^2$) | Bonding Temp. (°C.) | Grab Strength Properties | | | | Water Column Height (Mill.) | Air Flow Rate (CFM) |
|---|---|---|---|---|---|---|---|---|---|---|---|---|---|---|---|---|
| | 1 | | 2 | | 3 | | 4 | | | | Cross Direction | | Machine Direction | | | |
| | dtex | % | dtex | % | dtex | % | dtex | % | | | Strength (g) | Elong. (%) | Strength (%) | Elong. (%) | | |
| A Control | 2.4W | 25 | 2.4W | 50 | — | — | 2.4W | 25 | 38 | 157 | 2700 | 120 | 7900 | 70 | 118 | 469 |
| B Control | 2.4W | 25 | 2.4W | 50 | — | — | 2.4W | 25 | 47 | 157 | 3800 | 160 | 10000 | 80 | 100 | 338 |
| C | 2.4W | 17 | 0.8W | 33 | 0.8W | 33 | 2.4W | 17 | 38 | 157 | 1600 | 70 | 6800 | 30 | 204 | 235 |
| D | 2.4W | 30 | 0.8W | 20 | 0.8W | 20 | 2.4W | 30 | 38 | 157 | 2100 | 80 | 7500 | 40 | 171 | 310 |
| E | 2.4W | 25 | 0.8W | 25 | 0.8W | 25 | 2.4W | 25 | 49 | 157 | 2200 | 70 | 7900 | 40 | 211 | 198 |
| F | 2.4W | 13 | 0.8W | 37 | 0.8W | 37 | 2.4W | 13 | 46 | 157 | 1900 | 70 | 7100 | 30 | 211 | 198 |
| G | 1.7B | 17 | 0.9B | 33 | 0.9B | 33 | 1.7B | 17 | 35 | 155 | 2600 | 90 | 10000 | 40 | 205 | 215 |
| H | 1.7B | 25 | 0.9B | 25 | 0.9B | 25 | 1.7B | 25 | 46 | 157 | 3000 | 90 | 12700 | 40 | 245 | 155 |
| I | 1.7B | 22 | 0.9B | 28 | 0.9B | 28 | 1.7B | 22 | 51 | 158 | 3800 | 100 | 16300 | 40 | 235 | 119 |
| J | 1.7B | 25 | 0.9B | 25 | 0.9B | 25 | 1.7B | 25 | 55 | 156 | 4400 | 100 | 15900 | 40 | 267 | 121 |
| K | 1.7W | 17 | 1.0G | 33 | 1.0G | 33 | 1.7W | 17 | 48 | 157 | 3500 | 110 | 13600 | 50 | 154 | 158 |
| L | 1.7W | 17 | 1.0Y | 33 | 1.0Y | 33 | 1.7W | 17 | 48 | 157 | 3500 | 110 | 12700 | 50 | 223 | 148 |
| M | (50%/50% Fiber Blend of 1.7B/0.9B to each carding) | | | | | | | | 49 | 157 | 2600 | 100 | 11800 | 40 | 209 | 166 |
| N | (100% 0.9B to each machine) | | | | | | | | 49 | 157 | 2300 | 70 | 10700 | 30 | 260 | 125 |
| SMS (Kimberly-Clark Corporation); Basis Wt. = 40 g/m$^2$ | | | | | | | | | | | | | | | 300 | 60 |
| SONTARA (DuPont); Basis Wt. = 52 g/m$^2$ | | | | | | | | | | | | | | | 185 | 46 |

SMS is a nonwoven spun-bonded/melt blown/spun-bonded polypropylene composite fabric, available from Kimberly-Clark Corporation, Roswell, Ga. SONTARA is a spunlaced polyester/wood pulp nonwoven fabric, available from Du Pont, Wilmington, Del.

Samples A and B are controls, and Samples C through N are examples of this invention. The data show the unique combination of improved water barrier properties and good air permeability obtained for the fabrics of this invention. Table 1 also indicates that the currently available commercial fabrics SMS and SONTARA exhibit low air permeability, even though they have good liquid barrier properties.

EXAMPLE 2

Nonwoven webs were produced by using a series of sequentially arranged carding machines as described in Example 1. The carding machines were supplied with polypropylene hydrophobic staple fibers Type 211 (available from Hercules Incorporated, Wilmington, Del.) with differing or similar fineness as indicated in Table 2. The staple fibers were carded by the carding machine and carded webs were deposited on top of each other on a moving belt to form a layered web structure for inline thermal consolidation at a line speed of 13.7 meters/minute. The basis weight of individual webs was varied as indicated in Table 3 to make composite structures. In some samples a finish-free polypropylene spun-bonded fabric with 14 g/m$^2$ basis weight from American Nonwovens, Inc., Vernon, Ala., U.S.A., was incorporated prior to calender bonding. Samples O and R contained the spunbonded fabric at the bottom of the combined carded webs from carding machines 1 through 4 and in sample P the spunbonded fabric was fed between carding machines 2 and 3, thereby sandwiching the spunbonded fabric between two sets of the carded webs of this invention. Thermal bonding was carried out by using heated calendar rolls with a point pattern with a total bond area of 15%. The temperatures of the calender rolls are also indicated in Table 2. The first temperature is the temperature of the top calender and the second temperature is the temperature of the bottom calender. The decitex (dtex) and the percent of the total weight of staple fibers supplied to each carding machine are given in Table 2. The letter designation after the dtex indicates the color of the fiber: W—white; B—blue; G—green; Y—yellow. These hydrophobic fibers had the surface finish described in Example 1 comprising a mixture of polydimethylsiloxane and neutralized phosphate esters.

TABLE 2

| | Carding Machine Number | | | | | | | | Total Fabric Basis Weight | Bonding Temp. | Grab Strength Properties | | | | Water Column Height | Air Flow Rate |
|---|---|---|---|---|---|---|---|---|---|---|---|---|---|---|---|---|
| | 1 | | 2 | | 3 | | 4 | | | | Cross Direction | | Machine Direction | | | |
| Sample | dtex | % | dtex | % | dtex | % | dtex | % | (g/m²) | (°C.) | Strength (g) | Elong. (%) | Strength (%) | Elong. (%) | (Mill.) | (CFM) |
| O | (50%/50% Fiber blend of 1.7B/0.9B to each carding machine) | | | | | | | | 52[1] | 150/150 | 6800 | 69 | 15900 | 40 | 183 | 124 |
| P | (50%/50% Fiber blend of 1.7B/0.9B to each carding machine) | | | | | | | | 44[2] | 140/151 | 4500 | 59 | 11400 | 39 | 162 | 107 |
| Q | 0.9B | 25 | 1.7B | 25 | 1.7B | 25 | 0.9B | 25 | 33 | 140/151 | 3200 | 68 | 9500 | 31 | 169 | 168 |
| R | 0.9B | 25 | 1.7B | 25 | 1.7B | 25 | 0.9B | 25 | 53[1] | 140/151 | 5900 | 68 | 13200 | 40 | 203 | 101 |

[1]Including spunbonded fabric at the bottom.
[2]Including spunbonded fabric in the middle.

The data show the unique combination of improved water barrier properties and good air permeability obtained for the fabrics of this invention, and for laminates comprising the fabrics of this invention combined with a layer of spunbonded fabric.

It is not intended that the examples given here should be construed to limit the invention, but rather they are submitted to illustrate some of the specific embodiments of the invention. Various modifications and variations of the present invention can be made without departing from the scope of the appended claims.

We claim:

1. A liquid barrier fabric comprising at least one carded and thermally consolidated nonwoven web comprising at least 10% by weight, based on the total weight of cardable fibers, of cardable polyolefin staple fibers having a fiber fineness of about 0.5 to about 1.2 decitex, wherein the liquid strike-through resistance (mm of H$_2$O) of the fabric is at least about 150 millimeters and the air permeability is at least about 80 cubic feet per minute.

2. The fabric of claim 1, wherein the polyolefin fibers have a hydrophobic surface.

3. The fabric of claim 1, wherein the liquid strike-through resistance (mm of H$_2$O) of the fabric is at least 200 millimeters.

4. The fabric of claim 1, wherein the air permeability is at least 100 cubic feet per minute.

5. The fabric of claim 2, wherein the liquid strike-through resistance (mm of H$_2$O) of the fabric is at least 200 millimeters.

6. The fabric of claim 2, wherein the air permeability is at least 100 cubic feet per minute.

7. The fabric of claim 1, wherein the carded nonwoven web comprises at least 20% by weight, based on the total weight of the cardable fibers, of cardable polyolefin staple fibers having a fiber fineness of about 0.5 to about 1.2 decitex.

8. The fabric of claim 7, wherein the carded nonwoven web comprises at least 40% by weight, based on the total weight of cardable fibers, of cardable polyolefin staple fibers having a fiber fineness of about 0.5 to about 1.2 decitex.

9. The fabric of claim 1, wherein the polyolefin fibers are pigmented.

10. The fabric of claim 1, wherein the fabric has a basis weight of about 10 to about 100 g/m².

11. The fabric of claim 1, wherein the cardable polyolefin staple fibers have a fiber fineness of about 0.7 to about 1.2 decitex.

12. The fabric of claim 11, wherein the cardable polyolefin staple fibers have a fiber fineness of at least about 0.8 decitex.

13. The fabric of claim 11, wherein the cardable polyolefin staple fibers have a fiber fineness of not greater than 1.0 decitex.

14. The fabric of claim 1, wherein the polyolefin staple fibers have a length of about 1 to about 6 inches.

15. The fabric of claim 14, wherein the polyolefin staple fibers have a length of about 1 to about 3 inches.

16. The fabric of claim 15, wherein the polyolefin staple fibers have a length of about 1¼ to about 2 inches.

17. The fabric of claim 1, wherein the cardable polyolefin staple fibers are homogeneously blended with other cardable fibers.

18. The fabric of claim 17, wherein the other cardable fibers comprise a maximum of about 80% by weight of the cardable fibers.

19. The fabric of claim 18, wherein the other cardable fibers comprise a maximum of about 60% by weight of the cardable fibers.

20. The fabric of claim 17, wherein the other cardable fibers are polyolefin staple fibers having a fiber fineness greater than or less than about 0.5 to about 1.2 decitex.

21. The fabric of claim 17, wherein the other cardable fibers are hydrophilic fibers having a hydrophobic surface finish.

22. The fabric of claim 21, wherein the hydrophilic fibers are selected from the group consisting of polyamide, polyester, hydrophilic polyolefin, rayon, and cellulosic fibers.

23. The fabric of claim 21, wherein the surface finish is a fluorocarbon.

24. The fabric of claim 17, wherein the other cardable fibers are hydrophilic and the fabric is treated with a fluorocarbon.

25. The fabric of claim 17, wherein the other cardable fibers are spun from a melt containing a fluorocarbon.

26. The fabric of claim 2, wherein the polyolefin fibers have a surface finish comprising a lubricant and an antistatic agent.

27. The fabric of claim 26, wherein the surface finish comprises a mixture of a polysiloxane and a neutralized phosphoric acid ester.

28. The fabric of claim 1, wherein the polyolefin fibers are selected from the group consisting of ethylene homopolymers, propylene homopolymers, copolymers of 1-olefins, and mixtures thereof.

29. The fabric of claim 28, wherein the polyolefin fibers are polypropylene homopolymer fibers.

30. The fabric of claim 2, wherein the polyolefin fibers are selected from the group consisting of ethylene homopolymers, propylene homopolymers, copolymers of 1-olefins, and mixtures thereof.

31. The fabric of claim 30, wherein the polyolefin fibers are propylene homopolymer fibers.

32. The fabric of claim 28, wherein the ethylene homopolymer is selected from the group consisting of low density, high density and linear low density polyethylene.

33. The fabric of claim 28, wherein the propylene homopolymer is selected from the group consisting of atactic, syndiotactic, and isotactic polypropylene.

34. The fabric of claim 1, wherein the polyolefin fibers are multibicomponent fibers.

35. The fabric of claim 34, wherein the multicomponent fibers are sheath/core bicomponent fibers.

36. The fabric of claim 35, wherein the polyolefin is in the sheath of the bicomponent fiber.

37. A laminate comprising at least one layer of the fabric of claim 1 and at least one layer of another nonwoven material.

38. The laminate of claim 37, wherein the other nonwoven material comprises cardable fibers selected from the group consisting of polyamide, polyester, rayon, and cotton fibers.

39. The laminate of claim 38, wherein the laminate is thermally consolidated.

40. The laminate of claim 37, wherein the liquid strike-through resistance (mm of $H_2O$) is at least about 200 millimeters.

41. The laminate of claim 37, wherein the air permeability is at least 100 cubic feet per minute.

42. The laminate of claim 38, wherein the cardable polyolefin staple fibers have a fiber fineness of at least about 0.7 decitex.

43. The laminate of claim 42, wherein the cardable polyolefin staple fibers have a fiber fineness of at least about 0.8 decitex.

44. The laminate of claim 42, wherein the cardable polyolefin staple fibers have a fiber fineness not greater than about 1.0 decitex.

45. The laminate of claim 38, wherein the polyolefin staple fibers are pigmented.

46. The laminate of claim 37, wherein the other nonwoven material comprises hydrophobic polyolefin fibers having a fiber fineness greater than or less than about 0.5 to about 1.2 decitex.

47. The laminate of claim 46, wherein the laminate is thermally consolidated.

48. The laminate of claim 46, wherein the liquid strike-through resistance (mm of $H_2O$) of the laminate is at least about 150 millimeters and the air permeability is at least about 80 cubic feet per minute.

49. The laminate of claim 48, wherein the liquid strike-through resistance (mm of $H_2O$) of the laminate is at least about 200 millimeters.

50. The laminate of claim 48, wherein the air permeability of the laminate is at least about 100 cubic feet per minute.

51. The laminate of claim 46, wherein the cardable polyolefin staple fibers have a fiber fineness of at least about 0.7 decitex.

52. The laminate of claim 51, wherein the cardable polyolefin staple fibers have a fiber fineness of at least about 0.8 decitex.

53. The laminate of claim 51, wherein the cardable polyolefin staple fibers have a fiber fineness not greater than about 1.0 decitex.

54. The laminate of claim 46, wherein the polyolefin staple fibers are pigmented.

55. The laminate of claim 37, wherein the other nonwoven material comprises non-cardable fibers.

56. The laminate of claim 55, wherein the other nonwoven material is a spun-bonded material.

57. The laminate of claim 55, wherein the other nonwoven material is a meltblown material.

58. The laminate of claim 55, wherein the other nonwoven material is a hydroentangled material.

59. The laminate of claim 55, wherein the laminate is thermally consolidated.

60. The laminate of claim 55, wherein the liquid strike-through resistance (mm of $H_2O$) of the laminate is at least about 150 millimeters and the air permeability is at least about 80 cubic feet per minute.

61. The laminate of claim 60, wherein the liquid strike-through resistance (mm of $H_2O$) of the laminate is at least about 200 millimeters.

62. The laminate of claim 60, wherein the air permeability of the laminate is at least about 100 cubic feet per minute.

63. The laminate of claim 55, wherein the cardable polyolefin staple fibers have a fiber fineness of at least about 0.7 decitex.

64. The laminate of claim 63, wherein the cardable polyolefin staple fibers have a fiber fineness of at least about 0.8 decitex.

65. The laminate of claim 63, wherein the cardable polyolefin staple fibers have a fiber fineness of not greater than about 1.0 decitex.

66. The laminate of claim 55, wherein the polyolefin staple fiber is pigmented.

67. A laminate comprising at least one layer of the fabric of claim 1, and at least one layer of a film.

68. The laminate of claim 67, wherein the laminate is thermally consolidated.

69. The laminate of claim 67, wherein the film is a breathable film.

70. The laminate of claim 69, wherein the film is breathable polyethylene film.

71. The laminate of claim 69, wherein the film is breathable polypropylene film.

72. The laminate of claim 67, wherein the cardable polyolefin staple fibers have a fiber fineness of at least about 0.7 decitex.

73. The laminate of claim 72, wherein the cardable polyolefin staple fibers have a fiber fineness of at least about 0.8 decitex.

74. The laminate of claim 72, wherein the cardable polyolefin staple fibers have a fiber fineness of not greater than about 1.0 decitex.

75. The laminate of claim 67, wherein the polyolefin staple fiber is pigmented.

76. A laminate comprising the fabric of claim 23, and at least one layer of another nonwoven material.

77. The laminate of claim 76, wherein the laminate is thermally consolidated.

78. The laminate of claim 76, wherein the other cardable fibers are polyolefin staple fibers having a fiber fineness greater than or less than about 0.5 to about 1.2 decitex.

79. The laminate of claim 76, wherein the other cardable fibers are hydrophilic fibers having a hydrophobic surface finish.

80. The laminate of claim 79, wherein the hydrophilic fibers are selected from the group consisting of polyamide, polyester, hydrophilic polyolefin, rayon, and cellulosic fibers.

81. The laminate of claim 79, wherein the surface finish is a fluorocarbon.

82. The laminate of claim 76, wherein the other cardable fibers are spun from a melt containing a fluorocarbon.

83. The laminate of claim 76, wherein the fabric of claim 15 is treated with a fluorocarbon.

84. The laminate of claim 76, wherein the liquid strike-through resistance (mm of $H_2O$) of the laminate is at least about 150 millimeters and the air permeability is at least about 80 cubic feet per minute.

85. The laminate of claim 84, wherein the liquid strike-through resistance (mm of $H_2O$) of the laminate is at least about 200 millimeters.

86. The laminate of claim 84, wherein the air permeability of the laminate is at least about 100 cubic feet per minute.

87. The laminate of claim 76, wherein the cardable polyolefin staple fibers have a fiber fineness of at least about 0.7 decitex.

88. The laminate of claim 87, wherein the cardable polyolefin staple fibers have a fiber fineness of at least about 0.8 decitex.

89. The laminate of claim 87, wherein the cardable polyolefin staple fibers have a fiber fineness of not greater than 1.0 decitex.

90. The laminate of claim 76, wherein the polyolefin staple fiber is pigmented.

* * * * *

UNITED STATES PATENT AND TRADEMARK OFFICE
CERTIFICATE OF CORRECTION

PATENT NO.  : 5,534,340
DATED       : July 9, 1996
INVENTOR(S) : Rakesh K. Gupta & Richard J. Legare It is certified that error appears in the above-indentified patent and that said Letters Patent is hereby corrected as shown below:

Claim 34, Column 9, Line 13 replace "multibicomponent" by inserting --multicomponent--.

Signed and Sealed this

Twenty-ninth Day of October 1996

*Attest:*

BRUCE LEHMAN

*Attesting Officer*          *Commissioner of Patents and Trademarks*

UNITED STATES PATENT AND TRADEMARK OFFICE
CERTIFICATE OF CORRECTION

PATENT NO. : 5,534,340
DATED : July 9, 1996
INVENTOR(S) : Rakesh Kumar Gupta and Richard Jean Legare It is certified that error appears in the above-identified patent and that said Letters Patent is hereby corrected as shown below:

On the title page, item:   "[45]", prior to "September 10, 1996", please insert --*--.

Between the positions labeled "[73]" and "[21]", please insert:

--[*] Notice: The portion of the term of this patent subsequent to September 10, 2013 had been disclaimed.--

Signed and Sealed this

Twenty-second Day of April, 1997

Attest:

BRUCE LEHMAN

Attesting Officer

Commissioner of Patents and Trademarks